United States Patent [19]

Miles et al.

[11] Patent Number: 4,528,567
[45] Date of Patent: Jul. 9, 1985

[54] RADIO SIGNAL RECEIVING SYSTEM

[75] Inventors: Thomas P. Miles, Palo Alto; Richard A. Koenen, Cupertino, both of Calif.

[73] Assignee: Argo Systems, Inc., Sunnyvale, Calif.

[21] Appl. No.: 291,617

[22] Filed: Aug. 10, 1981

[51] Int. Cl.³ ............................................. G01S 5/04
[52] U.S. Cl. .................................... 343/442; 455/226; 343/417; 343/432; 343/444
[58] Field of Search ............... 343/416, 417, 418, 427, 343/432, 433, 434, 435, 436, 437, 440, 442, 447, 7 A, 7.7, 17.1 R, 368, 373, 374, 375, 381, 382, 383, 384, 444, 443, 420, 17.2 PC, 55 A, 74; 455/145, 146, 147, 226; 324/83 R, 83 A, 83 D; 328/133

[56] References Cited

U.S. PATENT DOCUMENTS

| 2,282,402 | 5/1942 | Hefele | 343/115 |
|---|---|---|---|
| 3,824,595 | 7/1974 | Hall | 343/113 R |
| 3,943,511 | 3/1976 | Evans et al. | 343/7 A |
| 4,200,840 | 4/1980 | Tsui | 455/226 |
| 4,203,114 | 5/1980 | Gerst et al. | 343/373 |
| 4,305,159 | 12/1981 | Stromswold et al. | 455/226 |
| 4,328,499 | 5/1982 | Anderson et al. | 343/444 |
| 4,338,605 | 7/1982 | Mims | 343/100 LE |

OTHER PUBLICATIONS

Skolnik, The Radar Handbook, 12/21/70, pp. 5(12), 20(4,5).

Primary Examiner—Theodore M. Blum
Assistant Examiner—Brian Steinberger
Attorney, Agent, or Firm—Flehr, Hohbach, Test, Albritton & Herbert

[57] ABSTRACT

A radio signal direction tendency system which includes an antenna array providing signals having a phase indicative of signal direction and a dual compressive receiver for reviewing and processing said signals to provide an output signal indicative of received signal direction.

5 Claims, 3 Drawing Figures

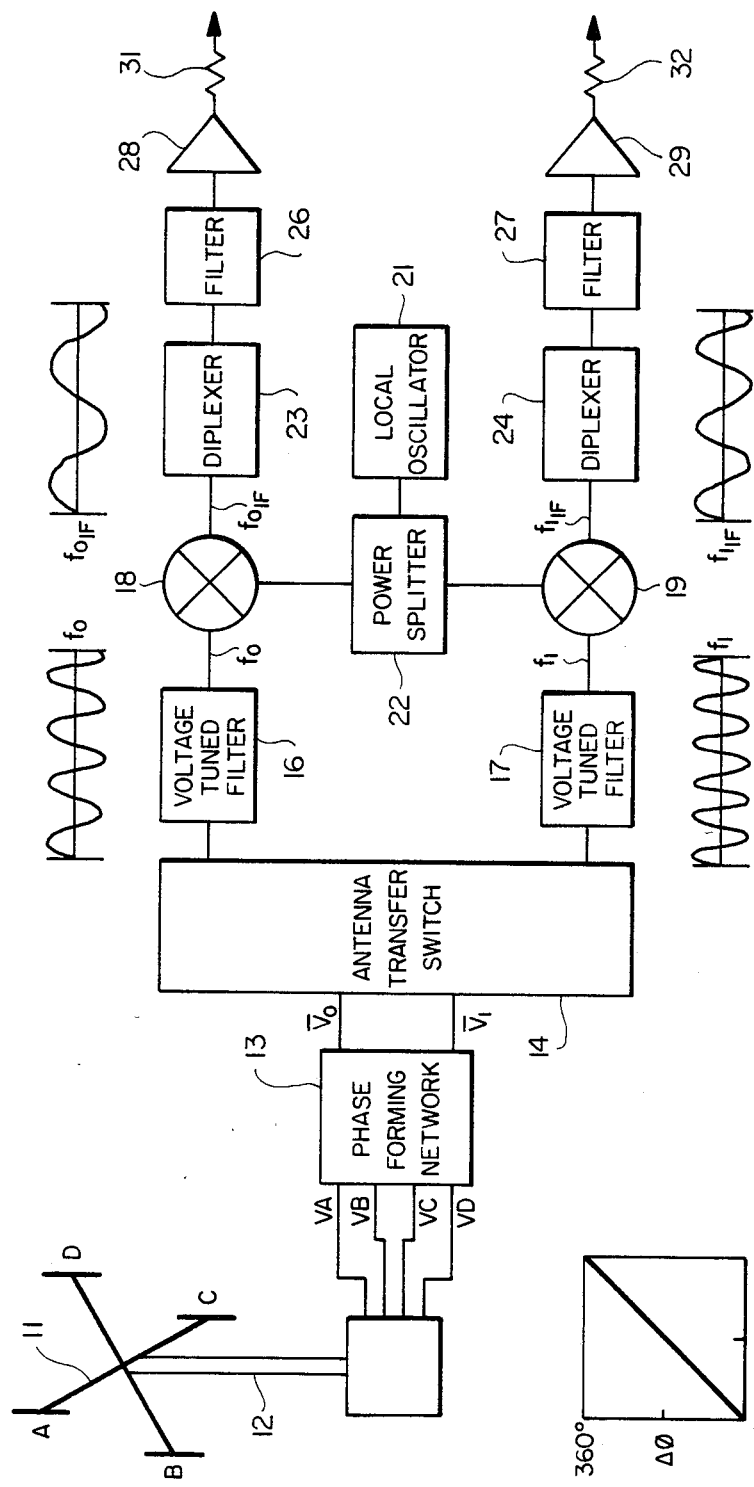
FIG_1A
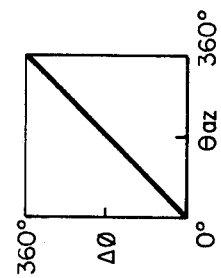
FIG_2

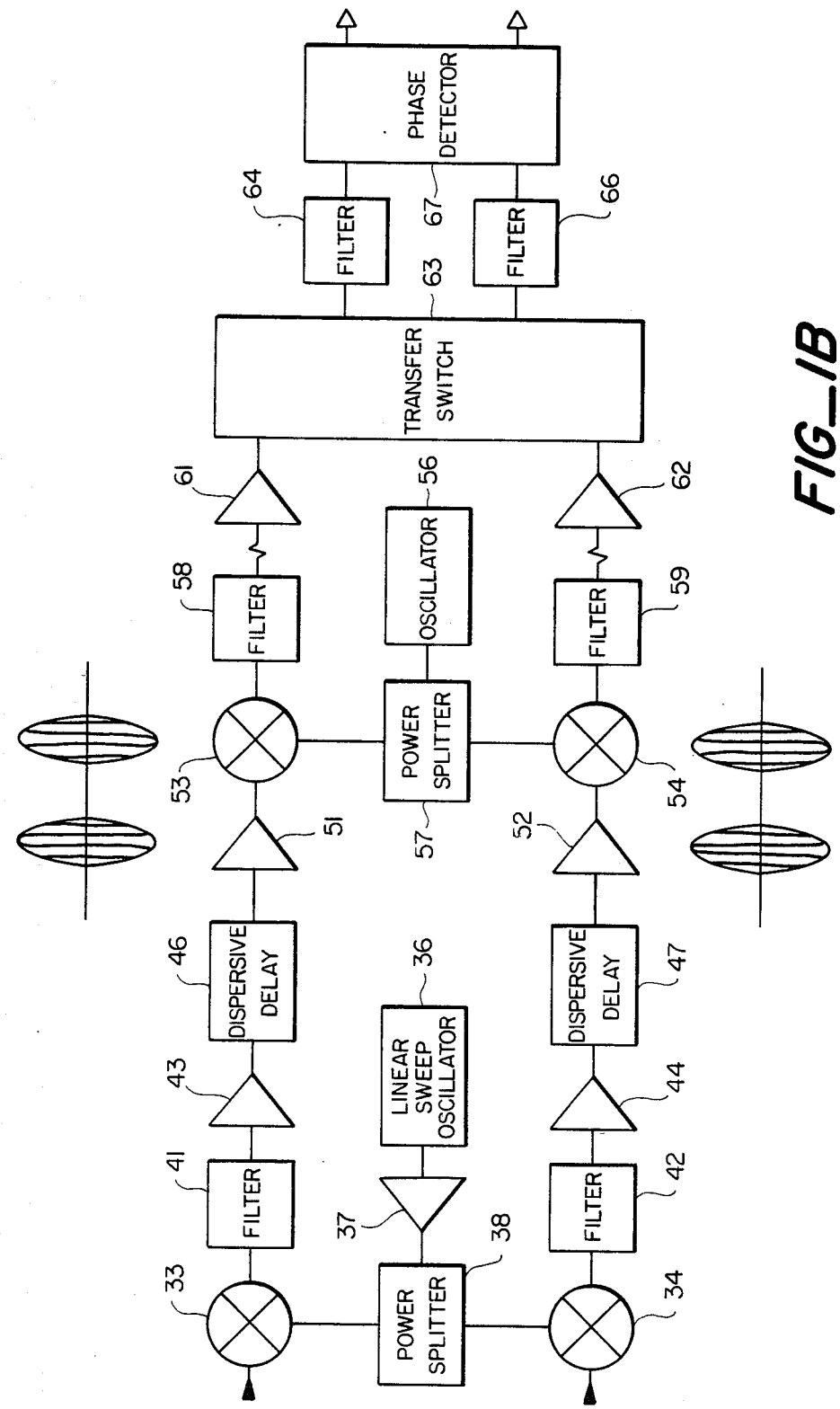
FIG_1B

RADIO SIGNAL RECEIVING SYSTEM

This invention relates generally to a radio signal receiving system and more particularly to a system for rapidly searching for radio signals within a frequency band and determining their direction and frequency.

There is a need in military operations, air traffic control and mobile traffic control for a radio signal receiving system capable of fast searching for radio signals in a frequency band having a dense radio signal environment and providing an indication of the signal frequency and direction with high resolution.

It is a general object of the present invention to provide a radio signal receiving system capable of rapidly scanning a frequency band to detect radio signals and determine their frequency and direction.

It is another object of the present invention to provide a radio signal receiving system which simultaneously measures and displays the azimuth angles of signals received within a given frequency band.

These and other objects are achieved by a radio signal direction finding system which includes an antenna array, a phase forming network connected to said array and providing two output signals having a phase difference which is indicative of the direction of the signal, a dual compressive receiver connected to receive said output signals and provide a pair of compressed output frequency pulses for each signal in the frequency band and phase detector means for receiving said frequency pulses and provide an output signal representative of the direction of the respective received incoming signal.

The invention will be more clearly understood with reference to the drawings in which:

FIGS. 1A & B is a block diagram of a radio signal receiving system in accordance with the invention.

FIG. 2 shows signal direction as a function of phase between the received antenna signals.

The receiving array 11 includes four dipole elements supported on arms carried on mast 12 which is suitably supported. This support is schematically shown as box 12a. The dipole elements are labeled A, B, C and D. The received signal voltages VA, VB, VC and VD from the dipoles are connected by wires to a phase forming network 13. The network provides an output signal voltage $\overline{V}_o$ which is the vector sum of the antenna outputs and an output signal voltage $\overline{V}_1$ which is the quadrature phase addition of the antenna outputs. The output signal voltages $\overline{V}_o$ and $\overline{V}_1$ have a relationship whereby the phase of the signal $\overline{V}_1$ with respect to $\overline{V}_o$ provides an indication of the azimuth angle, that is $$\Delta\phi = \theta$$

where $\Delta\phi$ is the phase angle between the voltages $\overline{V}_o$ and $\overline{V}_1$ and $\theta$ is the azimuth angle. This relationship is shown in FIG. 2.

The outputs are applied to an antenna transfer switch 14 to be presently described. Each of the signals are then applied to a voltage tuned filter 16, 17 which is either manually or electronically step tuned in frequency.

Outputs of the voltage tuned filters 16 and 17 are applied to mixers 18 and 19, respectively. A local oscillator 21 provides an intermediate frequency to a power splitter 22 which serves to apply power to each of the mixers. The output of the mixers is at intermediate frequency. Two input frequencies to the mixers $f_o$ and $f_1$ are illustrated. It is understood that there may be a number of frequencies within the band, only two are being described in this specific sample. The intermediate frequency outputs of the mixers $f_{o/F}$ and $f_{1/F}$ are applied to diplexers 23 and 24 respectively, and then to band pass filters 26, 27 which are tuned to intermediate frequency. The output from the mixers is amplified by amplifiers 28, 29 and applied via attenuators 31 and 32 to mixers 33 and 34. The other input to the mixers 33, 34 is a linearly swept frequency. The frequency is swept linearly over a 10 MHz frequency range in 1000 microseconds. The swept frequency is provided by oscillator 36 whose output power is amplified by amplifier 37 and applied to power splitter 38 and then to mixers 33 and 34.

The output of the mixers is filtered by filters 41 and 42 which serve to pass the chirped variable frequency to amplifiers 43 and 44.

The output of the amplifiers is applied to matched dispersive delay lines 46 and 47. The delay lines compress the two linearly frequency modulated signals to form two short pulses containing their frequency spectrum. There will be two pulses for each signal frequency received by the antenna with the pulses delayed a different amount for each frequency whereby they are separated at the output of the dispersive delay lines. The phase difference between the signals in each pair of pulses is maintained.

These short pulses are then amplified by amplifiers 51 and 52 and applied to mixers 53 and 54. The other input to the mixers is from oscillator 56 via power splitter 57. The output signal is then filtered by filters 58 and 59 and applied to log amplifiers 61 and 62. The log amplifiers receive the compressed pulses and provide two output signals, a video output signal and a limited intermediate frequency signal. The video output signal is then used in a spectrum analyzer and is proportional to the log of the input signal power level.

The limited intermediate frequency signal is applied to transfer switch 63 and to low pass filters 64 and 66 and to a phase detector 67. The phase detector 67 takes the two signals from the filters and determines their relative phase. The transfer switches 14 and 63 operate in synchronism to alternately apply the signals to the two channels whereby any delay errors are averaged. The transfer switches may, for example, be the Alpha Industries Model No. M01852-00.

The phase detector 67 has two outputs: a Y output which is proportional to the sine of the phase difference between the two input signals and an x output which is proportional to the cosine of this phase. These signals can then be applied to a polar coordinate display which will display the signal pulses, their azimuth angle and their frequencies.

In one particular example a receiver was constructed to receive signals in the frequency band 110–170 MHz. The voltage tuned filters 16 and 17 were stepped in 5 MHz steps over the band. The local oscillator 21 operated at a frequency of 170 to 230 MHz. The filters 26 and 27 were tuned to 60 MHz. The linear swept oscillator 36 swept from tuned to 67.5 MHz to 77.5 HMz in 1 ms. The dispersive delay lines 46 and 47 had a 500 ms. delay. The oscillator 56 operated at 42.5 MHz. Filters 58 and 59 were 30 MHz filters. The system operated to detect signals with a 3 KHz resolution.

The circuits just described comprise dual compressive receivers. The use of dual compressive receivers with matched delay lines allows the spectrum to be searched many times faster than with a conventional sweeping superhetorodyne receiver or spectrum analyzer. The system is step tuned at a high rate for example 5 MHz/ms which provides a high probability of detection along with direction for signals as short as 100 ms occuring anywhere in a 500 MHz band.

What is claimed:

1. A radio signal direction finding system comprising an antenna array, a phase forming network connected to the antenna array and providing two output signals having a phase difference which is indicative of the signal direction, a pair of matched compressive receivers each connected to receive one of said output signals and provide a pair of compressed output pulses for each received signal, and phase detector means for receiving said compressed pulses and determining the relative phase of the carrier signal in said compressed pulses and provide output signals representative of the phase differences.

2. A radio signal direction finding system as in claim 1 in which said matched compressive receivers each include a mixer providing an intermediate frequency, a linearly swept frequency oscillator and a mixer for each of said receivers serving to receive the swept frequency and the intermediate frequency signal and provide linearly frequency modulated signals, a delay line providing the short, compressed output pulses.

3. A radio signal direction finding system as in claim 1 in which said phase detector means includes a mixer for receiving each of said output pulses, and a log amplifier providing a limited intermediate frequency signal.

4. A radio signal direction finding system as in claim 2 in which said phase detector means includes a mixer for receiving each of said output pulses, and a log amplifier providing a limited intermediate frequency signal.

5. A radio signal direction finding system as in claim 1, including a first transfer switch connected to the inputs of said pair of compressive receivers and a second transfer switch connected to the output of said pair of compressive receivers, said first and second transfer switches operated in synchronism to alternately apply signals to the receivers and average delay errors through the system.

* * * * *